E. BUCKINGHAM.
THREAD MILLING HOB AND METHOD OF MAKING.
APPLICATION FILED DEC. 1, 1919.

1,407,837.

Patented Feb. 28, 1922.
5 SHEETS—SHEET 1.

Inventor
Earle Buckingham
By S. Jay Teller
Attorney.

E. BUCKINGHAM.
THREAD MILLING HOB AND METHOD OF MAKING.
APPLICATION FILED DEC. 1, 1919.

1,407,837.

Patented Feb. 28, 1922.

Inventor
Earle Buckingham
By S. Jay Teller
Attorney.

Inventor
Earle Buckingham
By S. Jay Teller
Attorney.

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

THREAD-MILLING HOB AND METHOD OF MAKING.

1,407,837.

Specification of Letters Patent.   Patented Feb. 28, 1922.

Application filed December 1, 1919. Serial No. 341,790.

*To all whom it may concern:*

Be it known that I, EARLE BUCKINGHAM, a citizen of the United States, residing at Hartford, in the county of Hartford and State of Connecticut, have invented certain new and useful Improvements in Thread-Milling Hobs and Methods of Making, of which the following is a specification.

The invention relates particularly to thread milling hobs having their teeth formed by the intersection of right hand and left hand helical grooves which intersect each other in the proper relationship and which also intersect the generally longitudinal grooves or gashes between the lands. One of the advantages of a hob of this type is that the teeth may be ground not only on their front cutting faces but also on their lateral faces, it being thus possible to remove any distortion resulting from hardening. Hobs of this type can therefore be formed with a high degree of accuracy.

One of the objects of the invention is to provide a hob of this type having teeth arranged in generally longitudinal helical rows, the cutting faces at the front of the lands being helicoidal. Another object of the invention is to provide a hob of this type having the teeth of successive rows staggered with respect to each other and formed with a height considerably in excess of the depth of the thread to be cut so that the hob can be sharpened by grinding the cutting faces without changing the effective shapes of the teeth. These two features may be and in fact are preferably combined in a single hob. A hob constructed in accordance with the invention may be formed with the teeth in annular rows or with the teeth arranged in conformity with a thread. The hob may be of uniform diameter throughout or it may be formed with different diameters at different points. The cutting faces may be radial or undercut, as desired.

The invention is particularly applicable to hobs for cutting sharp V-threads but it is not so limited and a further object of the invention is to provide a hob of this type having the tops of the teeth flattened or otherwise shaped to permit the cutting of U. S. standard threads or threads of other forms.

Another object of the invention is to provide an improved method whereby hobs having the characteristics hereinbefore set forth may be constructed.

In the accompanying drawings I have shown several forms of hobs embodying the invention and I have illustrated the different ways of practicing the method whereby these different hobs may be made. It will be understood, however, that the drawings are for illustrative purposes only and that they are not to be construed as defining or limiting the scope of the invention, the claims being relied upon for that purpose.

Of the drawings:

Fig. 27 is a fragmentary development view showing a hob blank with one set of helical grooves cut therein, as a part of the method of making the hob illustrated in Figs. 21 and 22.

Figure 1:
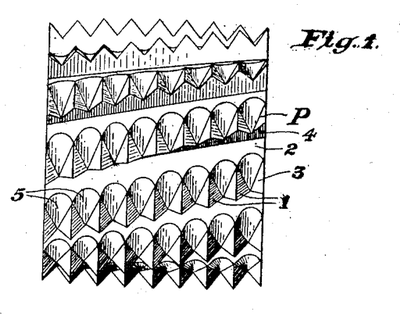
Figures 1 and 2 are side and end views respectively of a hob embodying certain features of the invention.
Figure 2:
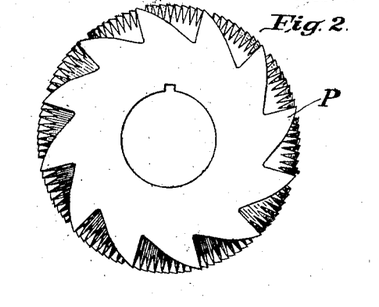

Referring particularly to Figs. 1 and 2 of the drawings, it will be seen that I have provided a thread cutting hob P having its cutting teeth 1 arranged in generally longitudinal but helical rows, the teeth of each row having a common helicoidal front cutting face. The teeth are formed by cutting sets of inclined right and left hand helical grooves in a blank and by cutting generally longitudinal helical gashes 2 which leave helical lands 3 with helicoidal front cutting faces 4. The grooves are V-shaped but I do not limit myself to grooves having sharp bottoms. Inasmuch as the teeth are formed by the inclined intersecting grooves they are provided with side relief; and, as the sides of the teeth are inclined with respect to the axis, the teeth also have radial relief. The lead and spacing of the grooves are so determined that the positions of the teeth conform to the aforesaid generally longitudinal helicoidal cutting faces. The lands and cutting faces are shown as being left hand but it will be understood that the invention is not so limited. Any convenient number of lands and cutting faces may be selected. As illustrated the cutting faces are radial but as to this there may be variation.

The grooves may be cut in any desired way as for instance by the lathe tool or a milling cutter. After the hob has been preliminarily formed and after it has been hardened the sides of the grooves may be ground to remove any initial irregularities and any distortion due to hardening.

As shown in Fig. 1, the cutting teeth 1 are arranged in annular rows, the hob therefore being formed without lead. It is possible, however, as will be presently explained, to construct the hob so that the teeth conform to a thread, the hob then being formed with lead. The hob P is shown as being of uniform diameter throughout but this is not essential. As will presently appear, the hob may be formed with different diameters, for instance, being conical.

Figures 3, 4:
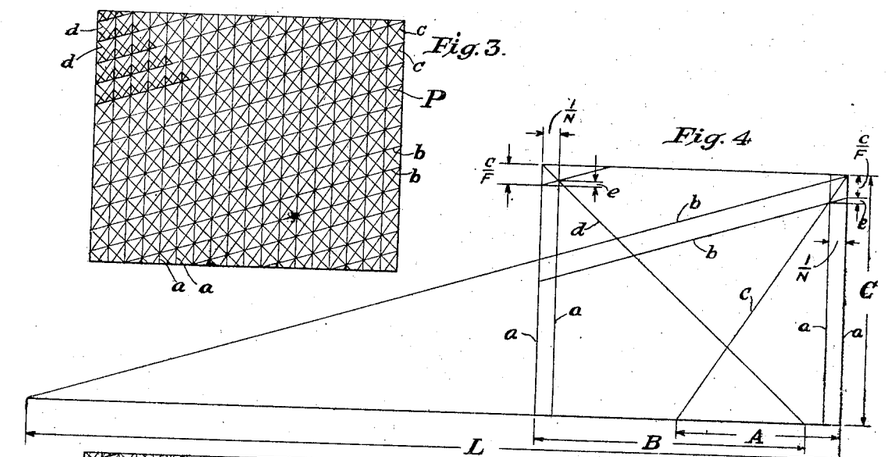
Fig. 3 is a diagrammatic development view of the hob illustrated in Figs. 1 and 2.
Fig. 4 is a mathematical diagram relating to the hob illustrated in Figs. 1 to 3.

The structure of the hob and the method of making will be more clearly understood from a consideration of the diagrammatic Fig. 3. In this figure, the lines $a$ represent the positions of the annular rows of teeth 1. The lines $b$ represent the inclined or helicoidal cutting faces 4, these being illustrated as left hand. The lines $c$ represent the helical tops of the ridges between the grooves, inclined or having a lead in the same direction as the cutting faces, and the lines $d$ represent the tops of the ridges between the helical grooves inclined or having a lead in the opposite direction from the cutting faces. Some of the teeth are represented in heavy lines in the upper left hand corner. The cutting of the right and left hand grooves and the cutting of the inclined longitudinal gashes are so related that the lines $b$, $c$, and $d$ representing the edges of the gashes and grooves intersect at common points, thus forming cutting teeth 1 which extend backward from the inclined or helicoidal cutting faces represented by the lines $b$. The amounts of the inclinations or leads of the grooves differ from each other to an extent dependent on the amount of the inclination or lead of the cutting faces. The axial spacings of the grooves are dependent on the leads thereof and the grooves with the same direction of lead and the cutting faces and the grooves with the opposite direction of lead have axial spacings which are respectively decreased and increased in relation to the axial spacing of the teeth by amounts dependent on the amount of lead of the cutting faces. With a hob such as P the number of grooves in each set is the same as the number of lands and cutting faces. In practice, it is ordinarily more convenient to cut the right and left hand grooves first and then to cut the inclined longitudinal gashes 2 at such positions that the cutting faces will be formed at the intersections of the said grooves.

It will be seen that supplemental backward facing teeth are initially formed between the forward facing teeth 1. These must be removed by a separate operation to leave the spaces 5 as shown. This operation may be conveniently performed in a relieving lathe.

The longitudinal leads of the right and left hand grooves may be readily determined mathematically assuming that one knows the number of threads per inch to be cut by the finished hob, the longitudinal lead of the helical gashes and of the cutting faces, and the number of the said gashes and cutting faces. Let it be assumed that—

N = Number of threads per inch.
F = Number of gashes and cutting faces.
L = Lead of gashes and cutting faces.
A = Lead of the helical grooves inclined in the same direction as the cutting faces.
B = Lead of the helical grooves inclined in the opposite direction from the cutting faces.

Referring to Fig. 4, it will be seen that, if C is the circumference, $$\frac{e}{\frac{1}{N}} = \frac{C}{L}$$

$$e = \frac{C}{LN}$$

It will also be seen that—

$$\frac{A}{C} = \frac{\frac{1}{N}}{\frac{C}{F}+e} = \frac{\frac{1}{N}}{\frac{C}{F}+\frac{C}{LN}}$$

$$A = \frac{LF}{LN+F}$$

Similarly it will be seen that—

$$\frac{B}{C} = \frac{\frac{1}{N}}{\frac{C}{F}-\frac{C}{LN}}$$

$$B = \frac{LF}{LN-F}$$

It is to be observed that the foregoing values A and B are independent of the circumference, and hence of the diameter, of the hob. The actual inclinations of the right and left hand grooves will vary with the diameter but the leads will remain the same.

Figures 5, 6:
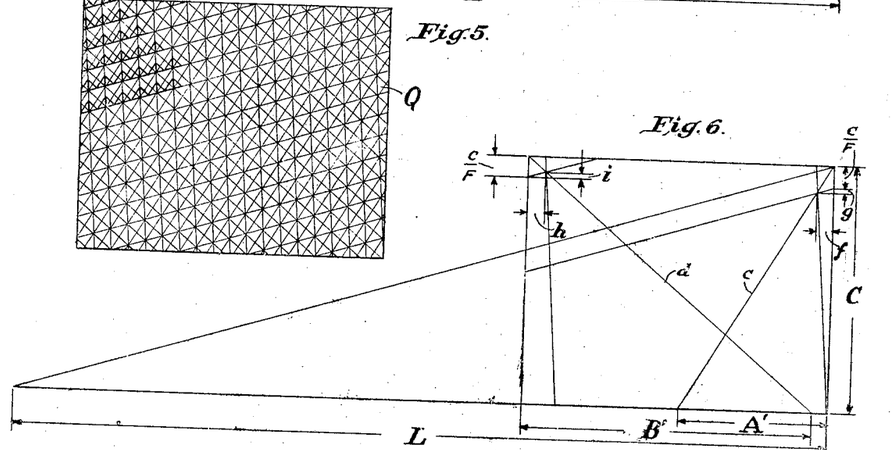
Fig. 5 is a diagrammatic development view similar to Fig. 3 but showing a hob somewhat different from that illustrated in Figs. 1 to 3 in that the teeth are arranged in conformity with a thread.
Fig. 6 is a mathematical diagram similar to Fig. 4 but relating to the hob illustrated in development in Fig. 5.

Fig. 5 is a development view of a hob Q similar to the hob P shown in Figs. 1 to 3, but having the teeth arranged in conformity with a thread, the hob being thereby formed with a lead. The lines $a$, $b$, $c$ and $d$ correspond respectively to the similar lines in Fig. 3. The arrangement of the teeth on the hob is secured solely by changes in the leads and the spacings of the right and left hand helical grooves. Certain changes are made in the leads as will presently appear. With a hob such as Q the number of grooves inclined in the same direction as the cutting faces is one less than the number of cutting faces and the number of grooves inclined in the opposite direction is one more than the number of cutting faces, thus changing the axial spacings of the grooves of the two sets.

Referring to Fig. 6, let it be assumed that A′ and B′ correspond respectively to A and B. It will be apparent that $$f = \frac{1}{N} - \frac{\frac{1}{N}}{F} = \frac{F-1}{NF}$$

and that—

$$\frac{g}{f} = \frac{C}{L}$$

$$g = \frac{C\left(\frac{F-1}{NF}\right)}{L} = \frac{C(F-1)}{LNF}$$

It will also be clear that—

$$\frac{A'}{C} = \frac{f}{\frac{C}{F}+g} = \frac{\frac{F-1}{NF}}{\frac{C}{F}+\frac{C(F-1)}{LNF}}$$

$$A' = \frac{L(F-1)}{LN+(F-1)}$$

Similarly it will be seen that—

$$h = \frac{1}{N} + \frac{\frac{1}{N}}{F} = \frac{F+1}{NF}$$

and that—

$$\frac{i}{h} = \frac{C}{L}$$

$$i = \frac{C\left(\frac{F+1}{NF}\right)}{L} = \frac{C(F+1)}{LNF}$$

It will also be clear that—

$$\frac{B'}{C} = \frac{h}{\frac{C}{F}-i} = \frac{\frac{F+1}{NF}}{\frac{C}{F}-\frac{C(F+1)}{LNF}}$$

$$B' = \frac{L(F+1)}{LN-(F+1)}$$

It is to be observed that the values of A′ and B′ are also independent of the circumference, and hence of the diameter, of the hob. The actual inclinations of the right and left hand grooves will vary with the diameter but the leads will remain the same. With helicoidal cutting faces such as herein shown and described it is necessary not only to properly determine the leads of the right and left hand grooves but also to properly determine the angles of the sides of the grooves, particularly the angles of the sides which are effective to form the teeth, that is, the left hand sides of the right hand grooves and the right hand sides of the left hand grooves. These angles are measured at axial planes of intersection. These effective angles differ from each other to an extent dependent on the lead of the cutting faces. The angles of the sides of the grooves with the same direction of inclination or lead as the cutting faces and of the grooves with the opposite direction of inclination or lead are respectively increased and decreased in relation to the angles of the corresponding sides of the teeth by amounts dependent on the lead of the cutting faces.

Figure 7:
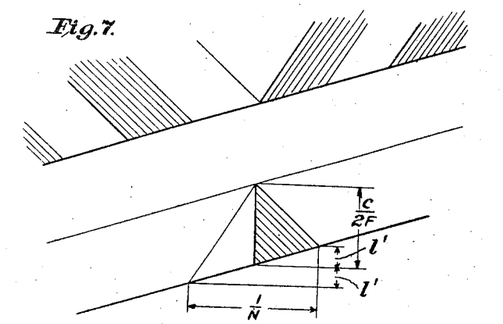
Figs. 7 to 10 are mathematical diagrams relating to the hob illustrated in Figs. 1 to 3.
Figure 8:
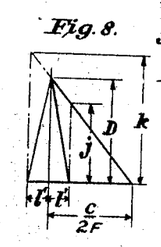
Figures 9, 10:
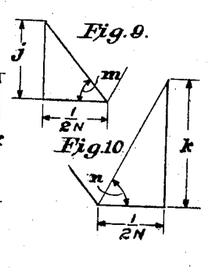

For purposes of explanation it will be assumed that the cutting faces are left hand as shown. Fig. 7 is a diagrammatic plan view showing two grooves intersecting to form a single tooth of the hob P. It will be seen that the width of this tooth is $\frac{1}{N}$ and that the circumferential length of the tooth is $\frac{C}{2F}$ Referring to Fig. 8, it will be seen that the height of the tooth is D, this being the depth of a sharp V-thread. Fig. 9 is a fragmentary sectional view of the tooth taken on an axial plane through the rear corner, the height at this plane being $j$; and Fig. 10 is a fragmentary sectional view of the tooth (extended) taken on an axial plane through the front corner, the height at this plane being $k$. It will be obvious that—

$$\frac{1'}{\frac{1}{2N}} = \frac{C}{L}$$

$$1' = \frac{C}{2LN}$$

and that—

$$\frac{j}{D} = \frac{\frac{C}{2F} - \frac{C}{2LN}}{\frac{C}{2F}}$$

$$j = \frac{D(LN - F)}{LN}$$

Similarly it will be seen that—

$$\frac{k}{D} = \frac{\frac{C}{2F} + \frac{C}{2LN}}{\frac{C}{2F}}$$

$$k = \frac{D(LN + F)}{LN}$$

In Fig. 9, the angle at the left hand side of the right hand groove is shown at $m$, and in Fig. 10, the angle at the right hand side of the left hand groove is shown at $n$. Then—

$$\tan m = \frac{j}{\frac{1}{2N}} = \frac{2D(LN - F)}{L}$$

and $$\tan n = \frac{k}{\frac{1}{2N}} = \frac{2D(LN + F)}{L}$$

It will be seen that the angles of the sides of the grooves like the leads thereof, are independent of the circumference or of the diameter of the hob.

Figs. 11 to 14 are similar respectively to Figs. 7 to 10 but relate to a hob Q with lead as shown in Fig. 5. It will be seen that there are further differences in the angles in accordance with the lead.

Figure 11:
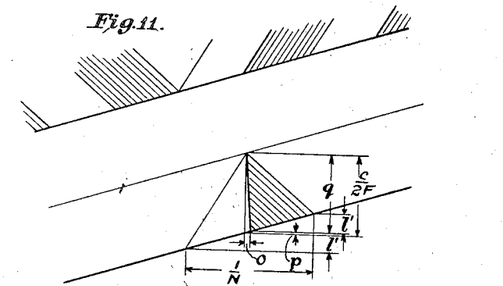
Figs. 11 to 14 are mathematical diagrams relating to the hob illustrated in development in Fig. 5.

Referring to Fig. 11, it will be seen that the tooth is inclined by an amount $o$ and that—

$$o = \frac{\frac{1}{N}}{2F} = \frac{1}{2NF}$$

It is apparent that $$\frac{p}{o} = \frac{C}{L}$$

$$p = \frac{C}{2LNF}$$

Figures 12, 13, 14:
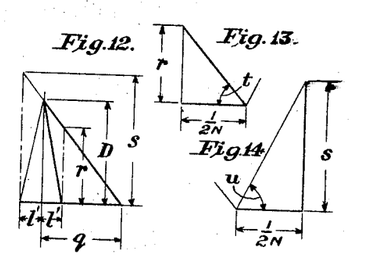

If $q$ is the length of the tooth measured circumferentially—

$$q = \frac{C}{2F} - p = \frac{C(LN - 1)}{2LNF}$$

$$\frac{r}{D} = \frac{q - 1'}{q}$$

$$r = \frac{D(LN - 1 - F)}{LN - 1}$$

Similarly—

$$\frac{s}{D} = \frac{q + 1'}{q}$$

$$s = \frac{D(LN - 1 + F)}{LN - 1}$$

It follows that—

$$\tan t = \frac{r}{\frac{1}{2N}} = \frac{2DN(LN-1-F)}{LN-1}$$

$$\tan u = \frac{s}{\frac{1}{2N}} = \frac{2DN(LN-1+F)}{LN-1}$$

Figure 15:
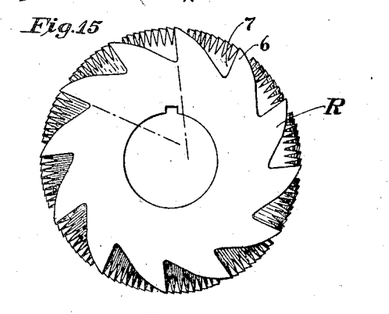
Fig. 15 is an end view similar to Fig. 2 but showing a hob with its cutting faces undercut or non-radial.

Fig. 15 is an end view similar to Fig. 2 but showing a hob R having teeth 6 with undercut non-radial cutting faces 7. The hob may be otherwise similar to the hob P shown in Figs. 1 to 3 and repetition of the description is unnecessary. It will be understood, however, that in the case of a hob with undercut cutting faces, I am not necessarily limited to cutting faces that are also helicoidal. The undercut hob may be formed with or without lead.

Figure 16:
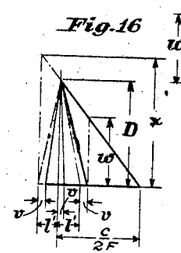
Figs. 16 to 18 are mathematical diagrams relating to the hob illustrated in Fig. 15.

It will be clear that in making the hob R a further correction must be made in the effective angles of the sides of the right and left hand grooves. The diagrams in Figs. 16, 17 and 18 relate to the hob T and are similar respectively to the diagrams in Figs. 8, 9, and 10. Let it be assumed that the amount of the undercut at the base of each tooth is $v$ and that the heights of the tooth at axial planes through the rear and front corners are $w$ and $x$, respectively.

Figures 17, 18:
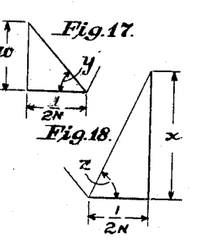

Then—

$$\frac{w}{j} = \frac{\frac{C}{2F} - 1' - v}{\frac{C}{2F} - 1'}$$

$$= 1 - \frac{2LNFv}{C(LN-F)}$$

$$w = D\left(\frac{LN-F}{LN} - \frac{2Fv}{C}\right)$$

and—

$$\frac{x}{k} = \frac{\frac{C}{2F} + 1' - v}{\frac{C}{2F} + 1'}$$

$$= 1 - \frac{2LNFv}{C(LN+F)}$$

$$x = D\left(\frac{LN+F}{LN} - \frac{2Fv}{C}\right)$$

If $y$ and $z$ are the angles of the sides of the grooves, then—

$$\tan y = \frac{w}{\frac{1}{2N}} = 2D\left(\frac{LN-F}{L} - \frac{2FNv}{C}\right)$$

$$\tan z = \frac{x}{\frac{1}{2N}} = 2D\left(\frac{LN+F}{L} - \frac{2FNv}{C}\right)$$

The hob P as shown in Figs. 1 to 3, while suitable for some classes of work, is nevertheless objectionable for the reason that it can not be sharpened on the front cutting face without changing the shapes of the teeth. It will be clear that the teeth have the maximum height D only at the front faces and that as these front faces are ground backward the height becomes less. To avoid this difficulty and to secure other advantages, I prefer to form the hob with one-half the number of teeth in each row and with the height of all of the teeth in excess of the depth of the thread to be cut. The teeth in each row are staggered with respect to those in each adjacent row.

Figure 19:
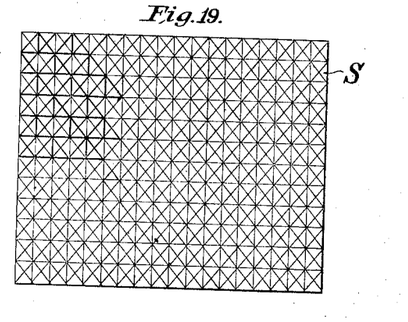
Fig. 19 is a diagrammatic development view similar to Figs. 3 and 5 but showing a hob having staggered teeth.
Figure 20:
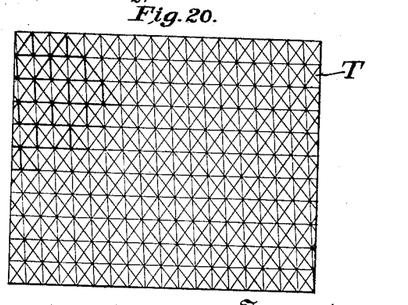
Fig. 20 is a diagrammatic development view similar to Fig. 19 but showing a hob having its teeth arranged in conformity with a thread.

Hobs S and T of this type are shown in development in Figs. 19 and 20, these hobs having plane longitudinal cutting faces. It will be seen that there are one-half as many teeth in each row as shown in Figs. 3 and 5 and that the teeth are twice as high and therefore twice as wide. The teeth of each row are staggered with respect to those of each adjacent row and it will therefore be apparent that the teeth of each row cut between those of the next row with the net result that the hobs S and T cut the same number of threads on the work as do the hobs P and Q shown respectively in Figs. 3 and 5. Only the top parts of the teeth are effective for cutting and there is therefore opportunity for the teeth to be ground on their front cutting faces without changing the shapes of the threads to be cut on the work. The axial spacing of the grooves is approximately twice the axial spacing of the required teeth and the circumferential spacing is approximately twice the circumferential spacing of the cutting faces. With a hob such as S without lead, the number of grooves in each set is one-half the number of cutting faces. In order that there may be a whole number of grooves in each set, it it obvious that the number of cutting faces must be an even number. In the case of a hob such as T formed with a lead the number of grooves having an inclination or lead in the same direction as the thread is one-half the number of cutting faces plus one. The number of grooves having an inclination or lead in the opposite direction from the thread is one-half the number of cutting faces minus one. It will therefore be clear that for a hob with lead the number of cutting faces must be an odd number.

Figure 21:
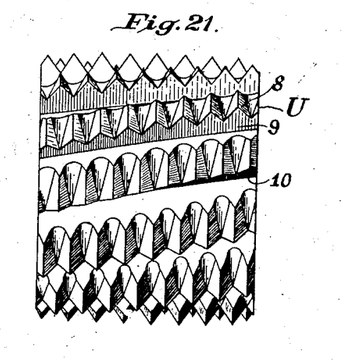
Figs. 21 and 22 are side and end views respectively of another hob embodying the invention.
Figure 22:
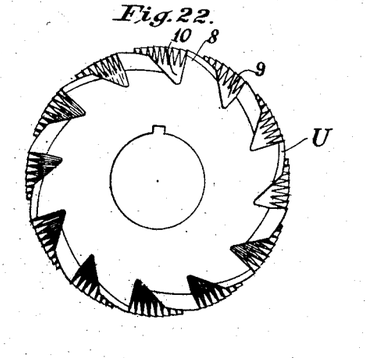

The structure and advantages of hobs of the staggered tooth type will be more apparent from an examination of Figs. 21 and 22 which show a hob U which is similar to the hob S except that in addition to having staggered teeth 8, it also has helical gashes 9 which form helicoidal cutting faces 10. These cutting faces may be either radial or undercut. It will be seen that the teeth of each row are staggered with respect to the teeth of each adjacent row so that the hob will cut a number of threads per inch which is twice the number of threads per inch in each row. The height of all of the teeth is in excess of the depth of the threads to be cut, preferably being twice the said depth. This permits the teeth to be sharpened on the front faces without changing the effective shapes of the teeth. As already stated the sides of the teeth can be readily ground after hardening, thus insuring great accuracy not only when the hob is new but also after resharpening.

Figure 23:
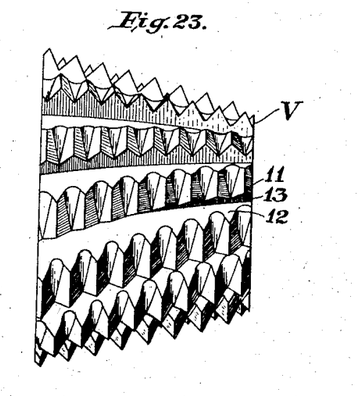
Figs. 23 and 24 are side and end views respectively of a hob similar to that illustrated in Figs. 21 and 22 but conical in form.
Figure 24:
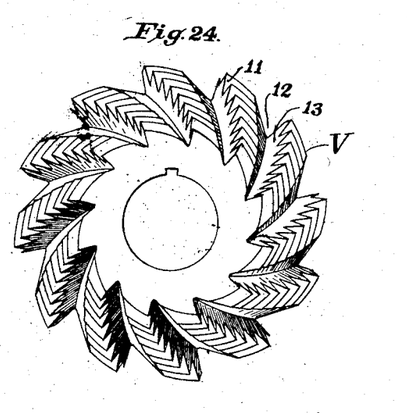

Figs. 23 and 24 show a hob V which is similar to the hob U, except that it has different diameters at different points, the hob being shown as conical in form. The teeth are represented by 11, the gashes by 12 and the cutting faces by 13.

Figure 25:
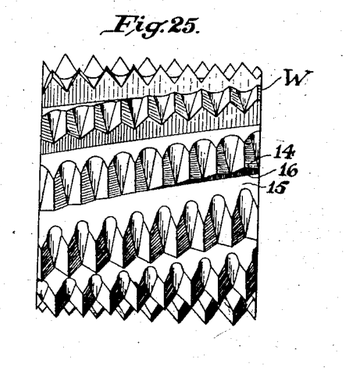
Fig. 25 is a side view of a hob similar to that shown in Figs. 21 and 22 but having teeth arranged in conformity with a thread.

Fig. 25 shows a hob W which is similar to the hob U except that the teeth are arranged in conformity with a thread and that there is an odd number of cutting faces instead of an even number. The teeth are represented by 14, the gashes by 15 and the cutting faces by 16.

Figure 26:
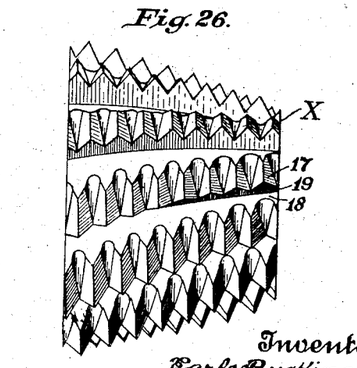
Fig. 26 is a side view of a hob similar to that shown in Figs. 23 and 24 but having the teeth arranged in conformity with a thread.

Fig. 26 shows a hob X which is similar to the hob V except that the teeth are arranged in conformity with a thread and that there is an odd number of cutting faces instead of an even number. The teeth are represented by 17, the gashes by 18 and the cutting faces by 19.

Figures 28, 29, 30, 31, 33:
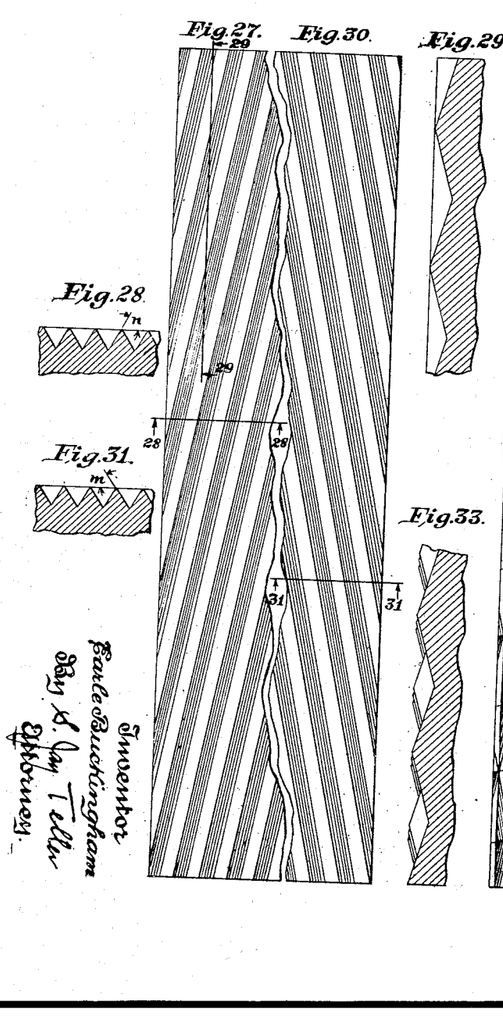
Fig. 28 is a fragmentary sectional view taken along the line 28—28 of Fig. 27.
Fig. 29 is a fragmentary sectional view taken along the line 29—29 of Fig. 27.
Fig. 30 is a view similar to Fig. 27 but showing a hob blank with a different set of helical grooves cut therein.
Fig. 31 is a fragmentary sectional view taken along the line 31—31 of Fig. 30.
Fig. 33 is a fragmentary sectional view taken along the line 33—33 of Fig. 32.
Figure 32:
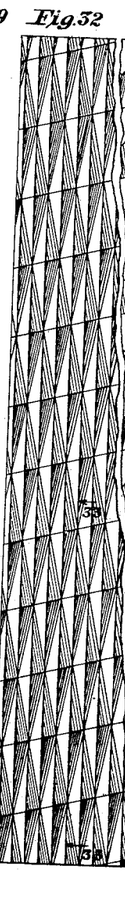
Fig. 32 is a fragmentary development view similar to Figs. 27 and 30 but showing a hob blank with both sets of helical grooves cut therein.

Figs. 27 to 37 illustrate successive steps in the formation of the hob U. Fig. 27 shows a fragmentary development of a blank with left hand grooves cut therein, these grooves having a lead A determined as already explained. The angles at the sides of the grooves particularly at the right hand sides have a value $n$ as shown in Fig. 28, this angle being determined as already explained. Fig. 29 is a fragmentary transverse section of the blank after one set of grooves has been cut therein. Fig. 30 is a view similar to Fig. 27 but showing the blank as it would appear if the right hand grooves were cut first. These grooves have a lead B which is determined as already explained. The angles at the sides of the grooves particularly at the left hand sides have a value $m$ as shown in Fig. 31, this angle being determined as already explained. It will be understood that either the left hand grooves or the right hand grooves may be cut first and that these grooves are started at any convenient positions, it not being necessary to cut the grooves of the two sets in any predetermined relative positions. Fig. 32 shows the blank as it appears with both the left hand grooves and the right hand grooves cut therein. Fig. 33 is a view similar to Fig. 29 but showing the section as it appears with both sets of grooves cut.

Figures 34, 36:
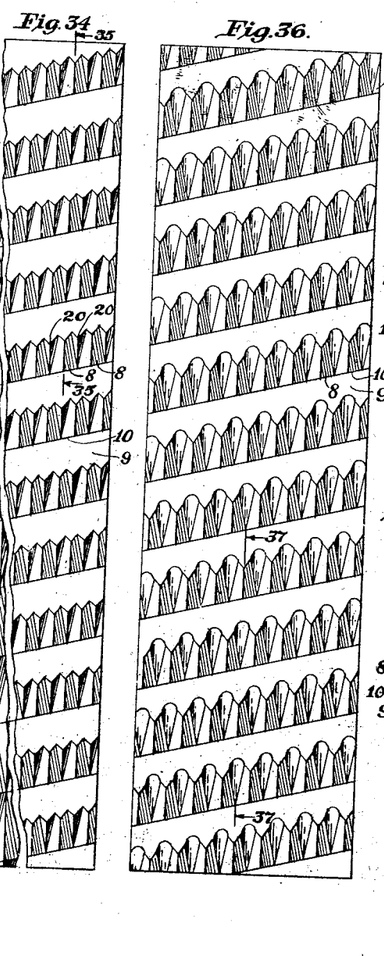
Fig. 34 is a fragmentary development view similar to Fig. 32 but also showing the longitudinal gashes.
Fig. 36 is a complete development view similar to Fig. 34 but showing the finished hob as illustrated in Figs. 21 and 22.
Figures 35, 37, 38:
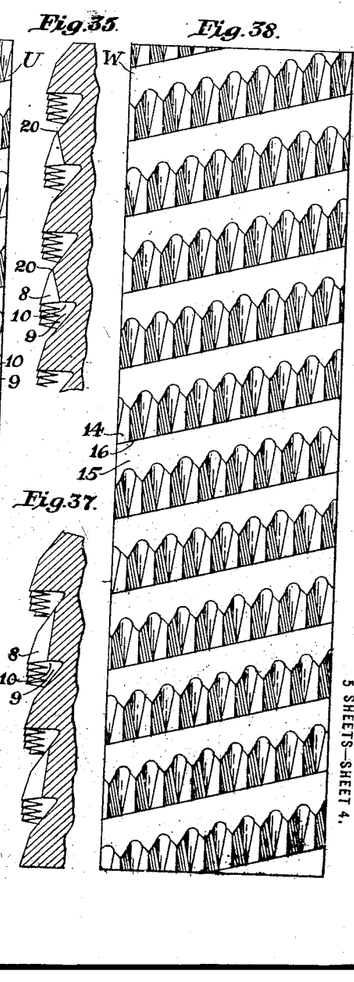
Fig. 35 is a fragmentary sectional view taken along the line 35—35 of Fig. 34.
Fig. 37 is a fragmentary sectional view taken along the line 37—37 of Fig. 36.
Fig. 38 is a complete development view similar to Fig. 36 but showing a hob such as illustrated in Fig. 25.

Fig. 34 is a view similar to Fig. 32 but showing the blank as it appears with the helical gashes 9 cut therein, to form the helicoidal cutting faces 10. It will be noted that the gashes cut off the rear parts of the teeth so that they do not extend backward to a point as do the teeth of the hobs P to R. While I do not limit myself to the cutting of the right and left hand grooves before the gashes are cut, I nevertheless prefer to so cut them as the gashes can conveniently be cut so that the cutting faces 10 will pass through the points of intersection of the dividing lines between the left hand grooves and the dividing lines between the right hand grooves. Fig. 35 is a fragmentary sectional view similar to Fig. 33 but also showing the gashes. An inspection of Figs. 34 and 35 shows that small projections 20 remain between the teeth 8.

Fig. 36 is a complete development view of the finished hob, this view differing from Fig. 34 in that the projections 20 have been removed. These projections are removed by a separate operation, and they may conveniently be removed in a relieving machine or chipped out by hand. Fig. 37 is a fragmentary sectional view similar to Fig. 35 except that the projections 20 have been removed.

Fig. 38 is a complete development similar to Fig. 36 but showing the hob W as illustrated in Fig. 25. In forming this hob, the left hand grooves have a pitch A' and the right hand grooves have a pitch B', both being determined as heretofore explained. The angles $u$ at the right hand side of the left hand grooves and the angles $t$ at the left hand side of the right hand grooves are determined as already explained. It will be observed that there is an odd number of rows of teeth, the reason for this having been explained in connection with Fig. 20.

Figures 39, 40, 41, 42, 43, 44, 45:
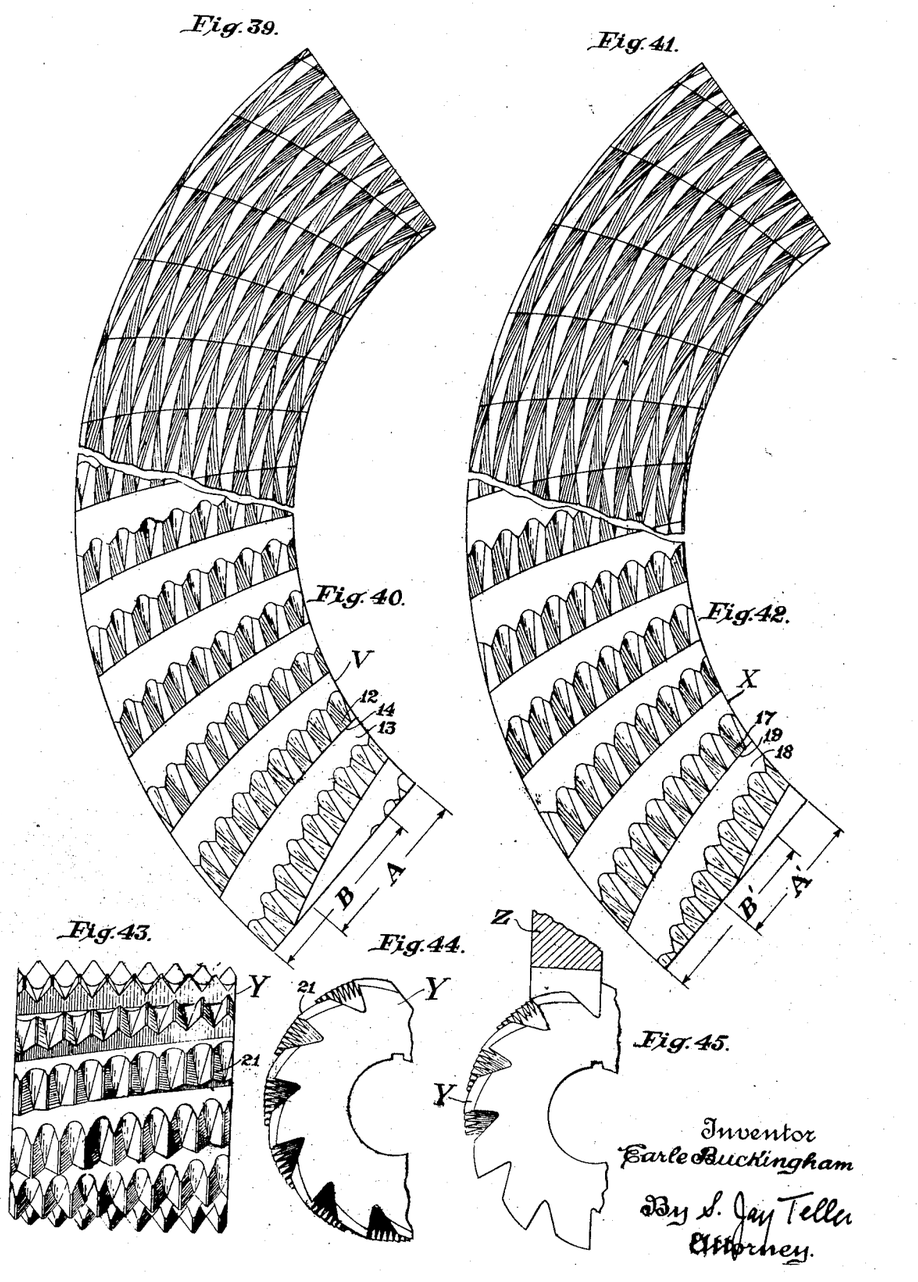
Figs. 39 and 40 are fragmentary views similar respectively to Figs. 32 and 36, but showing a conical hob such as illustrated in Figs. 23 and 24.
Figs. 41 and 42 are fragmentary views similar respectively to Figs. 39 and 40 but showing a conical hob such as illustrated in Fig. 26.
Figs. 43 and 44 are side and end views respectively of a hob similar to that illustrated in Figs. 21 and 22 but having the tops of the teeth flattened.
Fig. 45 is a diagrammatic view showing one method of flattening the teeth.

Figs. 39 and 40 are similar respectively to Figs. 32 and 36 except that they show the conical hob V as illustrated in Figs. 23 and 24. The longitudinal pitches of the left hand and right hand grooves are A and B, respectively, these being the same as for the hob U. The angles $n$ and $m$ are the same as for the hob U. It has already been pointed out that the diameter of the hob does not enter into the determination of the values of the leads A and B and of the angles $m$ and $n$.

Figs. 41 and 42 are similar respectively to Figs. 39 and 40 but show the hob X as illustrated in Fig. 26. The longitudinal pitches of the left hand and right hand grooves are A' and B', respectively, these being the same as for the hob W. The angles $u$ and $t$ are the same as for the hob W.

The hobs Q to X have all been described as having sharp teeth adapted to cut sharp V-threads, but it will be understood that the invention is by no means limited to hobs with sharp teeth and that the tops of the teeth can be flattened or otherwise shaped to adapt them for cutting U. S. standard threads or threads of other forms.

Figs. 43 and 44 are similar respectively to Figs. 21 and 22 except that they show a hob Y having the tops of its teeth 21 flattened to conform to U. S. standard threads. The flattened top surfaces extend backward and inward to conform to the effective radial relief on the other parts of the teeth. It will be understood that when the hob is in use, the flattened tops of the teeth cut the bottoms of the threads on the work and that the required flats at the tops of the threads on the work are secured by properly adjusting the hob so that it cuts only to such a depth as to leave the flats. The tops of the teeth may be flattened by means of a suitable tool in a relieving lathe or they may be flattened at the same time that the gashes are cut, use being made of a specially formed milling cutter for this purpose. Fig. 45 is a diagrammatic view showing a milling cutter Z which is suitably shaped not only for cutting the gashes but also for flattening the tops of the teeth.

What I claim is:

1. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces.

2. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the leads of the grooves of the two sets being different to an extent dependent on the amount of lead of the cutting faces.

3. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the grooves with the same direction of lead as the cutting faces and the grooves with the opposite direction of lead having axial spacings which are respectively decreased and increased in relation to the axial spacing of the teeth by amounts dependent on the amount of lead of the cutting faces.

4. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the effective angles of the sides of the grooves of the two sets being different from each other to an extent dependent on the amount of lead of the cutting faces.

5. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the effective angles of the sides of the grooves with the same direction of lead as the cutting faces and of the sides of the grooves with the opposite direction of lead being respectively increased and decreased in relation to the angles of the corresponding sides of the teeth by amounts dependent on the amount of lead of the cutting faces.

6. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the leads of the grooves of the two sets being different to an extent dependent on the amount of lead of the cutting faces, the effective angles of the sides of the grooves of the two sets being different from each other to an extent dependent on the amount of lead of the cutting faces.

7. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the grooves with the same direction of lead as the cutting faces and the grooves with the opposite direction of lead having axial spacings which are respectively decreased and increased in relation to the axial spacing of the teeth by amounts dependent on the amount of lead of the cutting faces, and the effective angles of the sides of the grooves with the same direction of lead as the cutting faces and of the sides of the grooves with the opposite direction of lead being respectively increased and decreased in relation to the angles of the corresponding sides of the teeth by amounts dependent on the amount of lead of the cutting faces.

8. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread.

9. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread, the lead of the in thread being in the opposite direction from that of the cutting faces.

10. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread, the leads of the grooves of the two sets being different to an extent dependent on the amount of lead of the cutting faces and the leads of the grooves of the two sets being further different to provide the aforesaid arrangement of the teeth in conformity with a thread.

11. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread, the grooves with the same direction of lead as the cutting faces and the grooves with the opposite direction of lead having axial spacings which are respectively decreased and increased in relation to the axial spacing of the teeth by amounts depending on the amount of lead of the cutting faces, and the spacings of the grooves being further changed by increasing that of one set and decreasing that of the other to provide the aforesaid arrangement of the teeth in conformity with a thread.

12. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread, the effective angles of the sides of the grooves of the two sets being different from each other to an extent dependent on the amount of lead of the cutting faces and the said effective angles being further different to provide the aforesaid arrangement of the teeth in conformity with a thread.

13. A thread milling hob having a plurality of generally longitudinal lands with front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being in excess of the depth of the thread to be milled.

14. A thread milling hob having a plurality of generally longitudinal lands with front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being approximately twice the depth of the thread to be milled.

15. A thread milling hob having a plurality of generally longitudinal lands with front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being approximately twice the depth of the thread to be milled and the spaces between the teeth being at all points at least as deep as the bottoms of the teeth at the cutting faces.

16. A thread milling hob having its teeth arranged in conformity with a thread, the said hob having a plurality of generally longitudinal lands with front cutting faces and having sets of right and left hand V-shaped helical grooves intersecting each other and intersecting the cutting faces to form similar relieved thread cutting teeth extending backward from the said cutting faces and as aforesaid arranged in conformity with a thread with those at each cutting face staggered with respect to those at each adjacent cutting face and the height of all of the teeth being in excess of the depth of the thread to be milled.

17. A thread milling hob having a plurality of longitudinal helical lands with helicoidal front cutting faces and having sets of right and left hand V-shaped helical grooves intersecting each other and intersecting the cutting face to form similar relieved thread cutting teeth extending backward from the said cutting faces, the teeth at each cutting face being staggered with respect to those at each adjacent cutting face.

18. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread with those at each cutting face staggered with respect to those at each adjacent cutting face.

19. A thread milling hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being in excess of the depth of the thread to be milled.

20. A thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces and arranged as aforesaid in conformity with a thread with those at each cutting face staggered with respect to those at each adjacent cutting face and the height of all of the teeth being in excess of the depth of the thread to be milled.

21. A differently diametered thread milling hob having a plurality of longitudinal helical lands with helicoidal front cutting faces and having sets of right and left hand V-shaped helical grooves intersecting each other and intersecting the cutting faces to form similar relieved thread cutting teeth extending backward from the said cutting faces.

22. A conical thread milling hob having a plurality of longitudinal helical lands with helicoidal front cutting faces and having sets of right and left hand V-shaped helical grooves intersecting each other and intersecting the cutting faces to form similar relieved thread cutting teeth extending backward from the said cutting faces.

23. A differently diametered thread milling hob having its teeth arranged in conformity with a thread, the said hob having a plurality of generally longitudinal helical lands with helicoidal front cutting faces and having sets of right and left hand V-shaped helical grooves intersecting each other and intersecting the cutting faces to form similar relieved thread cutting teeth extending backward from the said cutting faces, and arranged as aforesaid in conformity with a thread.

24. A differently diametered thread milling hob having a plurality of generally longitudinal lands with front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being in excess of the depth of the thread to be milled.

25. A differently diametered thread milling hob having a plurality of longitudinal helical lands with helicoidal front cutting faces and having sets of right and left hand V-shaped helical grooves intersecting each other and intersecting the cutting face to form similar relieved thread cutting teeth extending backward from the said cutting faces, the teeth at each cutting face being staggered with respect to those at each adjacent cutting face.

26. A thread milling hob having a plurality of generally longitudinal lands with undercut non-radial front cutting faces and having sets of right and left hand V-shaped helical grooves intersecting each other and intersecting the cutting faces to form similar relieved thread cutting teeth extending backward from the said cutting faces.

27. A thread milling hob having a plurality of generally longitudinal lands with undercut non-radial front cutting faces and having sets of right and left hand V-shaped helical grooves intersecting each other and intersecting the cutting faces to form similar relieved thread cutting teeth extending backward from the said cutting faces, the effective angles of the sides of the grooves of the two sets being different from the angles of the corresponding sides of the teeth to extents dependent on the amount of undercut.

28. A thread milling hob having a plurality of generally longitudinal helical lands with undercut non-radial helicoidal front cutting faces and having sets of right and left hand V-shaped helical grooves intersecting each other and intersecting the said cutting faces to form similar relieved thread cutting teeth extending backward from the said cutting faces.

29. A thread milling hob having a plurality of generally longitudinal helical lands with undercut non-radial helicoidal front cutting faces and having sets of right and left hand V-shaped helical grooves intersecting each other and intersecting the said cutting faces to form similar relieved thread cutting teeth extending backward from the said cutting faces, the effective angles of the sides of the grooves of the two sets being different from each other to an extent dependent on the amount of lead of the cutting faces and the said effective angles being further different from the angles of the corresponding sides of the teeth to extents dependent on the amount of undercut.

30. A thread milling hob having its teeth arranged in conformity with a thread, and said hob having a plurality of generally longitudinal helical lands with undercut non-radial helicoidal front cutting faces and having sets of right and left hand V-shaped grooves intersecting each other and intersecting the said cutting faces to form similar relieved thread cutting teeth extending backward from the said cutting faces and arranged as aforesaid in conformity with a thread.

31. A thread milling hob having its teeth arranged in conformity with a thread, the said hob having a plurality of generally longitudinal helical lands with undercut non-radial helicoidal front cutting faces and having two sets of right and left hand V-shaped helical grooves intersecting each other and intersecting the said cutting faces to form similar relieved thread cutting teeth extending backward from the said cutting faces and arranged as aforesaid in conformity with a thread, the effective angles of the sides of the grooves of the two sets being different from each other to an extent dependent on the amount of lead of the cutting faces to provide the aforesaid arrangement of the teeth in conformity with a thread and the effective angles at the sides of the grooves of the two sets being still further different from the angles of the corresponding sides of the teeth to extents dependent on the amount of undercut.

32. A thread milling hob having a plurality of generally longitudinal lands with undercut non-radial front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being in excess of the depth of the thread to be milled.

33. A thread milling hob having a plurality of generally longitudinal helical lands with undercut non-radial helicoidal front cutting faces and having sets of right and left hand V-shaped helical grooves intersecting each other and intersecting the cutting faces to form similar relieved thread cutting teeth extending backward from the cutting teeth extending backward from the said cutting faces, the teeth at each cutting face being staggered with respect to those at each adjacent cutting face.

34. A differently diametered thread milling hob having a plurality of longitudinal helical lands with undercut non-radial front cutting faces and having sets of right and left hand V-shaped helical grooves intersecting each other and intersecting the cutting faces to form similar relieved thread cutting teeth extending backward from the said cutting faces.

35. A differently diametered thread milling hob having a plurality of generally longitudinal lands with undercut non-radial front cutting faces and having sets of right and left hand V-shaped helical grooves intersecting each other and intersecting the cutting faces to form similar relieved thread cutting teeth extending backward from the said cutting faces, the teeth at each cutting face being staggered with respect to those at each adjacent cutting face and the height of all of the teeth being in excess of the depth of the thread to be milled.

36. A thread milling hob having a plurality of generally longitudinal lands with undercut non-radial front cutting faces and having sets of right and left hand V-shaped helical grooves intersecting each other and intersecting the cutting faces to form similar radially relieved thread cutting teeth extending backward from the said cutting faces, each of the teeth being provided with a flattened top surface which extends backward and inward from the cutting face in conformity with the effective radial relief on the other parts of the teeth.

37. A thread milling hob having a plurality of generally longitudinal helical lands with helicoidal front cutting faces and having sets of right and left hand V-shaped helical grooves intersecting each other and intersecting the cutting faces to form similar radially relieved thread cutting teeth extending backward from the said cutting faces, each of the teeth being provided with a flattened top surface which extends backward and inward from the cutting face in conformity with the effective radial relief on the other parts of the teeth.

38. A thread milling hob having a plurality of generally longitudinal lands with front cutting faces and having sets of right and left hand V-shaped helical grooves intersecting each other and intersecting the cutting faces to form similar radially relieved thread cutting teeth extending backward from the said cutting faces, the teeth at each cutting face being staggered with respect to those at each adjacent cutting face and the height of all of the teeth being in excess of the depth of the threads to be milled and each of the teeth being provided with a flattened top surface which extends backward and inward from the cutting face in conformity with the effective radial relief on the other parts of the teeth.

39. A thread milling hob having a plurality of generally longitudinal helical lands with helicoidal front cutting faces and having sets of right and left hand V-shaped helical grooves intersecting each other and intersecting the cutting faces to form similar radially relieved thread cutting teeth extending backward from the said cutting faces, the teeth at each cutting face being staggered with respect to those at each adjacent cutting face and each of the teeth being provided with a flattened top surface which extends backward and inward from the cutting face in conformity with the effective radial relief on the other parts of the teeth.

40. A thread milling hob with different diameters having a plurality of longitudinal helical lands with helicoidal front cutting faces and having sets of right and left hand V-shaped helical grooves intersecting each other and intersecting the cutting faces to form similar radially relieved thread cutting teeth extending backward from the said cutting faces, each of the teeth being provided with a flattened top surface which extends backward and inward from the cutting face in conformity with the effective radial relief on the other parts of the teeth.

41. The herein described method of making a thread milling hob, the method consisting in cutting sets of right and left hand helical V-shaped grooves in a blank, in cutting generally longitudinal helical gashes in the blank to form helical lands with helicoidal front cutting faces, and in so relating the said grooves and gashes that their edges intersect at common points to form similar relieved thread cutting teeth extending backward from the said helicoidal cutting faces.

42. The herein described method of making a thread milling hob, the method consisting in cutting sets of right and left hand helical V-shaped grooves in a blank, in cutting generally longitudinal helical gashes in the blank to form helical lands with helicoidal front cutting faces, in providing the grooves of the two sets with leads which differ to an extent dependent on the amount of lead of the cutting faces, and in so relating the grooves and gashes that their edges intersect at common points to form similar relieved thread cutting teeth extending backward from the said helicoidal cutting faces.

43. The hereindescribed method of making a thread milling hob, the method consisting in cutting sets of right and left hand helical V-shaped grooves in a blank, in cutting generally longitudinal helical gashes in the blank to form helical lands with helicoidal front cutting faces, in providing the grooves having the same direction of lead as the cutting faces and the grooves having the opposite direction of lead with axial spacings which are respectively decreased and increased in relation to the axial spacing of the teeth by amounts dependent on the amount of lead of the cutting faces, and in so relating the grooves and gashes that their edges intersect at common points to form similar relieved thread cutting teeth extending backward from the said helicoidal cutting faces.

44. The hereindescribed method of making a thread milling hob, the method consisting in cutting sets of right and left hand helical V-shaped grooves in a blank, in cutting generally longitudinal helical gashes in the blank to form helical lands with helicoidal front cutting faces, in providing the grooves of the two sets with effective angles at the sides thereof which are different from each other to an extent dependent on the amount of lead of the cutting faces, and in so relating the grooves and gashes that their edges intersect at common points to form similar relieved thread cutting teeth extending backward from the said helicoidal cutting faces.

45. The hereindescribed method of making a thread milling hob, the method consisting in cutting sets of right and left hand helical V-shaped grooves in a blank to form helical lands with helicoidal front cutting faces, in providing the sides of the grooves having the same direction of lead as the cutting faces and the sides of the grooves having the opposite direction of lead with effective angles which are respectively increased and decreased in relation to the angles of the corresponding sides of the teeth by amounts dependent on the amount of lead of the cutting faces, and in so relating the grooves and gashes that their edges intersect at common points to form similar relieved thread cutting teeth extending backward from the said helicoidal cutting faces.

46. The hereindescribed method of making a thread milling hob, the method consisting in cutting sets of right and left hand helical V-shaped grooves in a blank, in cutting generally longitudinal helical gashes in the blank, to form helical lands with helicoidal front cutting faces, in providing the grooves of the two sets with leads which differ to an extent dependent on the amount of lead of the cutting faces, in providing the sides of the grooves of two sets with effective angles which are different from each other to an extent dependent on the amount of lead of the cutting faces, and in so relating the grooves and gashes that their edges intersect at common points to form similar relieved thread cutting teeth extending backward from the said helicoidal cutting faces.

47. The hereindescribed method of making a thread milling hob, the method consisting in cutting sets of right and left hand helical V-shaped grooves in a blank, in cutting generally longitudinal helical gashes in the blank to form helical lands with helicoidal front cutting faces, in providing the grooves having the same direction of lead as the cutting faces and the grooves having the opposite direction of lead with axial spacings which are relatively decreased and increased in relation to the axial spacing of the teeth by amounts dependent on the amount of lead of the cutting faces, in providing the sides of the grooves having the same direction of lead as the cutting faces and the sides of the grooves having the opposite direction of lead with effective angles which are respectively increased and decreased in relation to the angles of the corresponding sides of the teeth by amounts dependent on the amount of lead of the cutting faces, and in so relating the grooves and gashes that their edges intersect at common points to form similar relieved thread cutting teeth extending backward from the said helicoidal cutting faces.

48. The hereindescribed method of making a thread milling hob having its teeth arranged in conformity with a thread, the method consisting in cutting sets of right and left hand helical V-shaped grooves in a blank, in cutting generally longitudinal helical gashes in the blank to form helical lands with helicoidal front cutting faces, and in so relating the said grooves and gashes that their edges intersect at common points to form similar relieved thread cutting teeth extending backward from the said helicoidal cutting faces and arranged as aforesaid in conformity with a thread.

49. The hereindescribed method of making a thread milling hob having its teeth arranged in conformity with a thread, the method consisting in cutting sets of right and left hand helical V-shaped grooves in a blank, in cutting generally longitudinal helical gashes in the blank to form helical lands with helicoidal front cutting faces, in providing the grooves of the two sets with leads which differ to an extent dependent on the amount of lead of the cutting faces, and in so relating the said grooves and gashes that their edges intersect at common points to form similar relieved thread cutting teeth extending backward from the said helicoidal cutting faces and arranged as aforesaid in conformity with a thread.

50. The hereindescribed method of making a thread milling hob having its teeth arranged in conformity with a thread, the method consisting in cutting sets of right and left hand helical V-shaped grooves in a blank, in cutting generally longitudinal helical gashes in the blank to form helical lands with helicoidal front cutting faces, in providing the grooves having the same direction of lead as the cutting faces and the grooves having the opposite direction of lead with axial spacings which are respectively decreased and increased in relation to the axial spacing of the teeth by amounts dependent on the amount of lead of the cutting faces, and in so relating the said grooves and gashes that their edges intersect at common points to form similar relieved thread cutting teeth extending backward from the said helicoidal cutting faces and arranged as aforesaid in conformity with a thread.

51. The hereindescribed method of making a thread milling hob having its teeth arranged in conformity with a thread, the method consisting in cutting sets of right and left hand V-shaped grooves in a blank, in cutting generally longitudinal helical gashes in the blank to form helical lands with helicodial front cutting faces, in providing the sides of the grooves of the two sets with effective angles which are different from each other to an extent dependent on the amount of lead of the cutting faces, and in so relating the said grooves and gashes that their edges intersect at common points to form similar relieved thread cutting teeth extending backward from the said helicoidal cutting faces and arranged as aforesaid in conformity with a thread.

52. The hereindescribed method of making a thread milling hob, the method consisting in cutting sets of right and left hand helical V-shaped grooves in a blank, in cutting generally longitudinal gashes in the blank to form lands with front cutting faces, the depth of the said grooves being in excess of the depth of the thread to be milled and the axial spacing of the grooves being approximately twice the axial spacing of the required teeth on the hob and the circumferential spacing being approximately twice the circumferential spacing of the cutting faces, and in so relating the said grooves and gashes that their edges intersect at common points to form on each land similar relieved thread cutting teeth extending backward from the corresponding face and staggered with respect to the teeth on each adjacent land.

53. The hereindescribed method of making a thread milling hob, the method consisting in cutting sets of right and left hand helical V-shaped grooves in a blank, in cutting generally longitudinal gashes in the blank to form lands with front cutting faces, the depth of the said grooves being in excess of the depth of the thread to be milled and the axial spacing of the grooves being approximately twice the axial spacing of the required teeth on the hob and the circumferential spacing being approximately twice the circumferential spacing of the cutting faces, in so relating the said grooves and gashes that their edges intersect at common points to form on each land similar relieved thread cutting teeth extending backward from the corresponding cutting face and staggered with respect to the teeth on each adjacent land, and in supplementary removing the metal projecting outward between the teeth and beyond the bases thereof.

54. The hereindescribed method of making a thread milling hob, the method consisting of cutting sets of right and left hand helical V-shaped grooves in a blank, in cutting generally longitudinal helical gashes in the blank to form helical lands with helicoidal front cutting faces, the axial spacing of the said grooves being approximately twice the axial spacing of the required teeth on the hob and the circumferential spacing being approximately twice the circumferential spacing of the cutting faces, and in so relating the said grooves and gashes that their edges intersect at common points to form on each land similar relieved thread cutting teeth extending backward from the corresponding helicoidal cutting face and staggered with respect to the teeth on each adjacent land.

55. The herein described method of making a thread milling hob, the method consisting of cutting sets of right and left hand helical V-shaped grooves in a blank, in cutting generally longitudinal helical gashes in the blank to form helical lands with helicoidal front cutting faces, the depth of said grooves being in excess of the depth of the thread to be milled and the axial spacing of the said grooves being approximately twice the axial spacing of the required teeth on the hob and the circumferential spacing being approximately twice the circumferential spacing of the cutting faces, and in so relating the said grooves and gashes that their edges intersect at common points to form on each land similar relieved thread cutting teeth extending backward from the corresponding helicoidal cutting face and staggered with respect to the teeth on each adjacent land.

56. The hereindescribed method of making a thread milling hob, the method consisting in cutting sets of right and left hand helical V-shaped grooves in a blank, in cutting generally longitudinal gashes in the blank to form lands with undercut non-radial front cutting faces, in providing the grooves of the two sets with effective angles at the sides thereof which are different from the angles of the corresponding sides of the teeth to an extent dependent on the amount of undercut, and in so relating the said grooves and gashes that their edges intersect at common points to form similar relieved thread cutting teeth extending backward from the said undercut faces.

57. The hereindescribed method of making a thread milling hob, the method consisting in cutting sets of right and left hand helical V-shaped grooves in a blank, in cutting generally longitudinal helical gashes in the blank to form helical lands with undercut non-radial helicoidal front cutting faces, in providing the grooves of the two sets with leads which differ to an extent dependent on the amount of lead of the cutting faces, in providing the sides of the grooves of the two sets with effective angles which are different from the angles of the corresponding sides of the teeth to an extent dependent on the amount of undercut, and in so relating the said grooves and gashes that their edges intersect at common points to form similar relieved thread cutting teeth extending backward from the said undercut cutting faces.

58. The hereindescribed method of making a thread milling hob having its teeth arranged in conformity with a thread, the method consisting in cutting sets of right and left hand helical V-shaped grooves in a blank, in cutting generally longitudinal helical gashes in the blank to form helical lands with undercut non-radial helicoidal front cutting faces, in providing the grooves of the two sets with leads which differ to an extent dependent on the amount of lead of the cutting faces, in providing the sides of the grooves of the two sets with effective angles which differ to an extent dependent on the amount of lead of the cutting faces and which are further different from the angles of the corresponding sides of the teeth to an extent dependent on the amount of undercut, and in so relating the said grooves and gashes that their edges intersect at common points to form similar resect at common points to form similar relieved thread cutting teeth extending backward from the said undercut cutting faces.

59. The hereindescribed method of making a thread milling hob, the method consisting in cutting sets of right and left hand helical V-shaped grooves in a blank, in cutting generally longitudinal gashes in the blank to form lands with undercut non-radial cutting faces, the depth of the said grooves being in excess of the depth of the thread to be milled and the axial spacing of the grooves being approximately twice the axial spacing of the required teeth on the hob and the circumferential spacing being approximately twice the circumferential spacing of the cutting faces, in providing the sides of the grooves of the two sets with effective angles which are different from the angles of the corresponding sides of the teeth to an extent dependent on the amount of the undercut, and in so relating the said grooves and gashes that their edges intersect at common points to form on each land similar relieved thread cutting teeth extending backward from the corresponding undercut cutting face and staggered with respect to the teeth on each adjacent land.

60. The hereindescribed method of making a thread milling hob, the method consisting in cutting sets of right and left hand helical V-shaped grooves in a blank, in cutting generally longitudinal helical gashes in the blank to form helical lands with undercut non-radial helicoidal cutting faces, the depth of the said grooves being in excess of the depth of the thread to be milled and the axial spacing of the grooves being approximately twice the axial spacing of the required teeth on the hob and the circumferential spacing being approximately twice the circumferential spacing of the cutting faces, in providing the grooves of the two sets with leads which differ to an extent dependent on the amount of lead of the cutting faces, in providing the sides of the grooves of the two sets with effective angles which are different from the angles of the corresponding sides of the teeth to an extent dependent on the amount of undercut, and in so relating the said grooves and gashes that their edges intersect at common points to form on each land similar relieved thread cutting teeth extending backward from the corresponding undercut cutting face and staggered with respect to the teeth on each adjacent land.

61. The hereindescribed method of making a thread milling hob, the method consisting in cutting sets of right and left hand helical V-shaped grooves in a blank, in cutting generally longitudinal gashes in the blank to form lands with undercut non-radial front cutting faces, in so relating the said grooves and gashes that their edges intersect at common points to form similar radially relieved thread cutting teeth extending backward from the said cutting faces, and in supplementally flattening the tops of the teeth in accordance with the radial relief on the other parts of the teeth.

62. The hereindescribed method of making a thread milling hob, the method consisting in cutting sets of right and left hand helical V-shaped grooves in a blank, in cutting generally longitudinal helical gashes in the blank, to form helical lands with helicoidal front cutting faces, in so relating the said grooves and gashes that their edges intersect at common points to form similar radially relieved thread cutting teeth extending backward from the said helicoidal cutting faces, and in supplementally flattening the tops of the teeth in accordance with the radial relief on the other parts of the teeth.

63. The hereindescribed method of making a thread milling hob, the method consisting in cutting sets of right and left hand helical V-shaped grooves in a blank, in cutting generally longitudinal helical gashes in the blank to form helical lands with helicoidal front cutting faces, the depth of the said grooves being in excess of the depth of the thread to be milled and the axial spacing of the grooves being approximately twice the axial spacing of the required teeth on the hob and the circumferential spacing being approximately twice the circumferential spacing of the cutting faces, in so relating the said grooves and gashes that their edges intersect at common points to form on each land similar relieved thread cutting teeth extending backward from the corresponding helicoidal cutting faces and staggered with respect to the teeth on each adjacent land, and in supplementally flattening the tops of the teeth in accordance with the radial relief on the other parts of the teeth.

64. The hereindescribed method of making a thread milling hob, the method consisting in cutting sets of right and left hand helical V-shaped grooves in a blank, in cutting generally longitudinal gashes in the blank to form lands with front cutting faces, in so relating the said grooves and gashes that their edges intersect at common points to form similar radially relieved thread cutting teeth extending backward from the said cutting faces, and in supplementally flattening the tops of the teeth in accordance with the radial relief on the other parts of the teeth, the cutting of the longitudinal gashes and the flattening of the teeth being effected at a single operation.

In testimony whereof, I hereto affix my signature.

EARLE BUCKINGHAM.